US009454791B2

United States Patent
Avila et al.

(10) Patent No.: US 9,454,791 B2
(45) Date of Patent: Sep. 27, 2016

(54) APPARATUS AND METHOD FOR GENERATING A FINGERPRINT AND IDENTIFYING A THREE-DIMENSIONAL MODEL

(71) Applicant: NBCUniversal Media, LLC, New York, NY (US)

(72) Inventors: Eric Avila, Los Angeles, CA (US); Braxton Perkins, La Canada, CA (US); Anthony Anderson, Castaic, CA (US)

(73) Assignee: NBCUNIVERSAL MEDIA, LLC, New York, NY (US)

( * ) Notice: Subject to any disclaimer, the term of this patent is extended or adjusted under 35 U.S.C. 154(b) by 104 days.

(21) Appl. No.: 14/581,838

(22) Filed: Dec. 23, 2014

(65) Prior Publication Data

US 2016/0180485 A1  Jun. 23, 2016

(51) Int. Cl.
*G06K 9/00* (2006.01)
*G06T 1/00* (2006.01)
*G06T 7/60* (2006.01)
*H04N 1/32* (2006.01)
*G06K 9/62* (2006.01)

(52) U.S. Cl.
CPC .............. *G06T 1/005* (2013.01); *G06K 9/6201* (2013.01); *G06T 7/602* (2013.01); *H04N 1/3232* (2013.01); *H04N 1/32352* (2013.01)

(58) Field of Classification Search
CPC ................... G06T 17/00; G06T 2207/10028; G06T 2207/30201; G06T 7/0089
USPC ......................................................... 382/154
See application file for complete search history.

(56) References Cited

U.S. PATENT DOCUMENTS

2015/0009214 A1\* 1/2015 Lee ....................... G06T 7/0046
345/420

\* cited by examiner

*Primary Examiner* — Manuchehr Rahmjoo
(74) *Attorney, Agent, or Firm* — Lee, Hong, Degerman, Kang & Waimey PC; Jonathan Kang; Justin Lee

(57) ABSTRACT

A method for matching a first three-dimensional (3D) model includes obtaining 3D source information of a second 3D model, the 3D source information including a plurality of physical characteristics of the second 3D model, determining a plurality of factors of the second 3D model based on the obtained 3D source information, obtaining a first 3D fingerprint of the first 3D model from a memory, the first 3D fingerprint comprising a plurality of factors associated with the first 3D model, comparing the plurality of factors of the second 3D model to the plurality of factors of the first 3D fingerprint, providing information of a match confidence level between the first 3D model and the second 3D model based on the comparison, and storing a second 3D fingerprint of the second 3D model in the memory, the second 3D fingerprint including the determined plurality of factors of the second 3D model.

23 Claims, 6 Drawing Sheets

```
solid Star
    facet normal 0 -1 0
        outer loop
            vertex 0.83404 0 0.694596
            vertex 0.36904 0 1.5
            vertex 1.78814e-006 0 0.75
        endloop
    endfacet
endsolid Star
```

```xml
<tdf>
    <asset_id></asset_id>
    <parts>
        <quad position="1">1<quad>
        <quad position="2">2<quad>
        <quad position="3">1<quad>
    </parts>
    <color>
        <quad position="1">
            <alpha></alpha>
            <red></red>
            <blue></blue>
            <green></green>
        </quad>
        <quad position="2">
            <alpha></alpha>
            <red></red>
            <blue></blue>
            <green></green>
        </quad>
        <quad position="3">
            <alpha></alpha>
            <red></red>
            <blue></blue>
            <green></green>
        </quad>
    </color>
    <clearance>
        <quad position="1">0</quad>
        <quad position="2">2</quad>
        <quad position="3">0</quad>
    </clearance>
    <texture>
        <quad position="1">0</quad>
        <quad position="2">0</quad>
        <quad position="3">0</quad>
    </texture>
    <wall_thickness>
        <quad position="1">1</quad>
        <quad position="2">2</quad>
        <quad position="3">1</quad>
    </wall_thickness>
    <tessellation>
        <quad position="1">1</quad>
        <quad position="2">2</quad>
        <quad position="3">1</quad>
    </tessellation>
    <curvature>
        <quad position="1">1</quad>
        <quad position="2">2</quad>
        <quad position="3">1</quad>
    </curvature>
    <size>
        <quad position="1">
            <length>1</length>
            <width>3</width>
            <height>3</height>
        </quad>
        <quad position="2">
            <length>1</length>
            <width>6</width>
            <height>4</height>
        </quad>
        <quad position="3">
            <length>1</length>
            <width>3</width>
            <height>3</height>
        </quad>
    </size>
    <volume>
        <quad position="1">1</quad>
        <quad position="2">5</quad>
        <quad position="3">1</quad>
    </volume>
</tdf>
```

APPARATUS AND METHOD FOR GENERATING A FINGERPRINT AND IDENTIFYING A THREE-DIMENSIONAL MODEL

With recent technological breakthroughs and advancements in three-dimensional (3D) printing technology, sometimes referred to as additive manufacturing, various implementations and commercialization opportunities of 3D printing have greatly expanded. Examples of these advancements include the ability to: print in new materials (including but not limited to metals, ceramics, plastics, bio-printing, carbon fiber, food materials); multi-materials printing allowing for a single model to be printed using multiple materials by a single 3D printer; multi-color printing allowing for a single model to be printed using multiple colors by a single 3D printer; and the ability to print using thinner layers and increased resolution, such as dots per inch (dpi).

With these and other advancements in 3D printing technology, the availability and lower cost of 3D printing tools may eventually lead to wide ranging changes in the way consumers purchase and consume goods in the near future. While the convenience, cost, and novelty of 3D printed goods present promising opportunities, these advancements may also pose new issues for manufacturers, content creators, and other creative content producing entities in controlling the sale and distribution of their goods and preventing unauthorized or criminal 3D printing of protected content and goods.

For instance, a content creator may design a new toy soldier figurine and make a file for 3D printing available for purchase and download on a 3D printing website. After uploading, customers of the website may download the 3D printing file and print the toy soldier figurine using either their at-home 3D printers or an online 3D printing service using commercial-grade 3D printers. Since the toy soldier figurine file includes only the file information needed to print the 3D model of the figurine, no rights management may be included with the file, and the file may easily be copied or transferred to other unlicensed parties after being obtained by the original purchaser. Additionally, in other examples, websites that allow for the purchase and download of various 3D printing files may wish to ensure that none of the files provided by their website is infringing upon another party's copyright.

The ability for a content creator, manufacturer, or distributor to accurately and consistently identify authorized or unauthorized goods produced via 3D printing methods may be advantageous in order to control the creation and distribution of protected content and goods. Thus, there is a great need for a solution to effectively identify a 3D model, and compare a 3D model to other known 3D model representations in order to identify authorized or unauthorized 3D printed goods.

SUMMARY

Embodiments of the present disclosure include creating an identifying fingerprint of a 3D model object, wherein the fingerprint includes uniquely identifying information of the 3D model including the shape, size, surface, color, thickness, proportion, volume, and the like. Various embodiments include storing the fingerprint and providing the fingerprint for comparison with scan information of other 3D models.

Embodiments of the present disclosure also include obtaining 3D information of a 3D model, determining a plurality of physical characteristics of the 3D model, obtaining fingerprint information from a database based on the physical characteristics of the 3D model, and comparing the 3D model to the obtained fingerprint information.

Embodiments of the present disclosure include an apparatus and method for identifying a 3D model by creating a 3D fingerprint uniquely identifying the 3D content. A method may include creating and storing a fingerprint of the 3D model by obtaining information from a scan of the 3D model, determining a plurality of physical characteristics of the 3D model based on the scanned information, and creating the fingerprint comprising the plurality of physical characteristics in a predefined data structure. The predefined data structure may be configured to assign each of the plurality of physical characteristics to a corresponding factor of a plurality of factors of the 3D model.

BRIEF DESCRIPTION OF THE DRAWINGS

The above and other aspects and features of the present disclosure will become more apparent upon consideration of the following description of embodiments, taken in conjunction with the accompanying drawing figures.

FIG. 6 is an example of an STL file representing 3D scan information according to an embodiment of the present invention.

FIG. 7 is an example of an XML file representing a 3D fingerprint according to an embodiment of the present invention.

DETAILED DESCRIPTION

In the following detailed description, reference is made to the accompanying drawing figures which form a part hereof, and which show by way of illustration specific embodiments of the present invention. It is to be understood by those of ordinary skill in this technological field that other embodiments may be utilized, and that structural, electrical, as well as procedural changes may be made without departing from the scope of the present invention. Wherever possible, the same reference numbers will be used throughout the drawings to refer to the same or similar parts.

Embodiments of the present invention relate to a system and method for identifying a 3D model by comparing a plurality of factors of the 3D model from a fingerprint of the 3D model to scan information of another 3D model.

Figure 1:
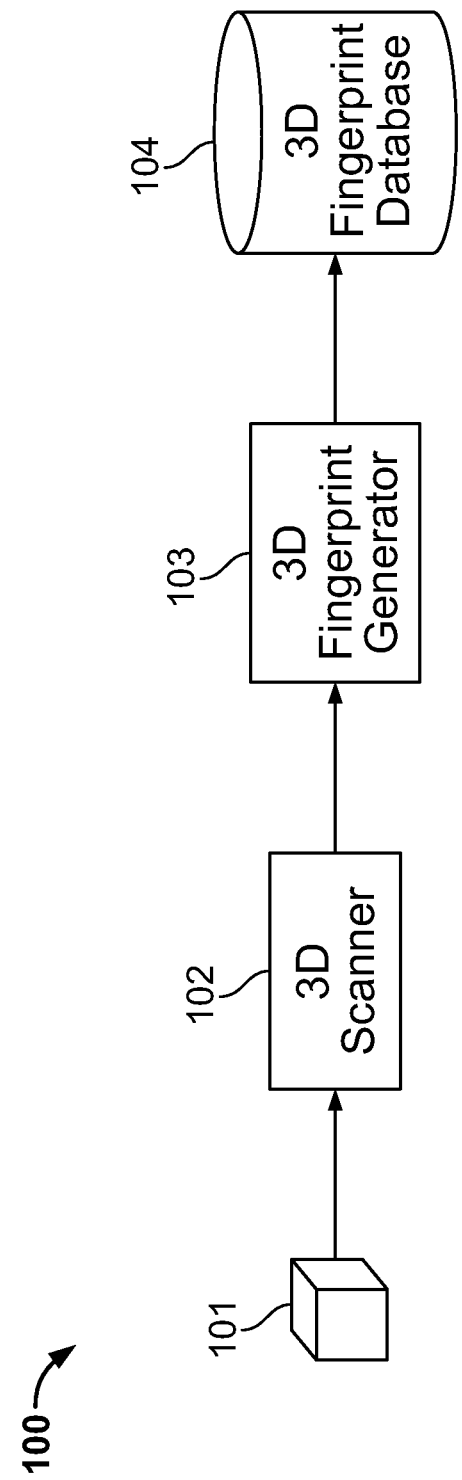
FIG. 1 is an illustration of an apparatus for identifying a 3D model according to an embodiment of the present invention.

Referring now to FIG. 1, a system 100 for generating a fingerprint of a 3D model 101 according to an embodiment of the present disclosure is shown. The system 100 includes a 3D scanner 102 configured to scan a 3D model 101 to capture various 3D information about the 3D model. The 3D scanner 102 of the embodiment may incorporate various techniques and technologies known and used in the related art for scanning real world objects to capture information including shape, appearance, color, and the like. Various types of 3D scanners incorporating known scanning technology are considered in this disclosure, including without limitation contact 3D scanners, time-of-flight scanners, triangulation scanners, conoscopic holography scanners, structured light scanners, modulated lights canners, and non-contact passive scanners.

The 3D scanner 102 generates data from scanning the surface, shape, color, appearance, and size of the 3D model 101. In one embodiment, the generated data may include information of a polygon mesh representing the shapes and surfaces of the 3D model 101. The 3D scanner may create a digital map of the 3D model by measuring and recording the locations of many points and vertices across the entire surface area of the 3D model 101. These measured points may then be connected to each other to form a polygon mesh. The polygon mesh data may include information of a collection of vertices, edges, and faces that define a shape of the 3D model 101. The faces may be in the form of triangles, quadrilaterals, or other convex polygons to provide information of the surface and shape of the 3D model 101.

In various embodiments, the polygon mesh data may be represented in a variety of ways, including face-vertex meshes, winged-edge meshes, half-edge meshes, quad-edge meshes, corner-tables, vertex-vertex meshes, and other polygon mesh representations known and used in the related art. The polygon mesh data may be output by the 3D scanner 102 in various file formats, including STL (stereolithography format), RAW (raw mesh), FBX (Autodesk), PLY (polygon file format), X3D (extensible 3D), and the like. Additionally, those of ordinary skill in the art will appreciate that additional and various file formats, polygon mesh representations, and 3D scanning techniques may be used and incorporated in the embodiments of the present disclosure, and such variations are considered herein.

Although FIG. 1 depicts an embodiment implementing a 3D scanner, other embodiments of the system 100 may obtain 3D information of the 3D object 101 from other sources, including directly from engineered 3D information files, such as CAD (computer assisted design) files. In such embodiments, the 3D information may be represented by various file formats according to various software implementations, such as SolidWorks files (.sldasm extension), 3D Studio files (.3ds extension), TrueSpace files, (.cab extension), AutoCAD files (.dws extension), Adobe 3D Reviewer files (.prw extension), and the like.

An example of a portion of an STL file 600 representing 3D scan information is shown in FIG. 6. The STL file 600 may include coordinate information of a plurality of vertices forming edges and faces of the polygon mesh. The example of FIG. 6 shows an STL file information associated with one face including three vertices defined by the coordinate information shown in the figure. It will be understood by those of ordinary skill in the art that the STL file, and any file format generated by a 3D scan of a 3D model, may include various additional information including all vertices information included in the polygon mesh, color of various polygon faces, size of the 3D model, and so on.

Referring back to FIG. 1, the 3D scanner 102 of an embodiment of the system 100 may output the 3D scan file to a 3D fingerprint generator 103. The 3D fingerprint generator may be configured to obtain the data of the 3D scan file and process the information to generate an identifying fingerprint file including information to accurately identify the 3D model. The 3D fingerprint generator 103 may recreate the polygon mesh of the 3D model 101 from the received 3D scan file to plot all of the provided coordinates forming the various surfaces, curves, and points of the model. From this information, the 3D fingerprint generator may determine a number of identifying factors to create an identifying fingerprint file including various measured physical characteristics each corresponding to an identifying factor.

For example, the 3D fingerprint generator 103 may measure and compute identifying physical characteristics of the 3D model 101, including, but not limited to: color, number of distinct parts that make up the 3D model 101, clearance distance between the distinct parts, texture patterns on a surface of the 3D model 101, thickness of a wall at a particular point of the 3D model 101, tessellation value including information of a number of tessellation patterns, angles and curvature at particular points of the 3D model, minimum bounding box size, volume of the minimum bounding box, volume of the material used in the 3D model 101, density of the 3D model, particular characteristics of the polygon mesh, particular vertices, edges, and faces of the polygon mesh, a center point of the bounding box (discussed further below), the number and location of quadrants defined by the intersections of three orthogonal places through the bounding box, and particular variations of the polygon mesh including tessellation, adaptive mesh refinement, and smoothing.

The 3D fingerprint generator 103 may be configured to perform the measurements and base all physical characteristic determinations from a consistent center point of each 3D model. This ensures that the information of a candidate 3D model is comparable to that of another 3D model by starting from the same consistent measurement starting point. In order to achieve this, the 3D fingerprint generator 103 may determine a center point of each 3D model such that the center point is consistent for identical or very similar 3D models, regardless of rotation, tilt, alignment, or other positioning variations of the 3D model. In some embodiments, the geometric center point of a minimum bounding box of the 3D model may be used as the center point.

Figure 2:
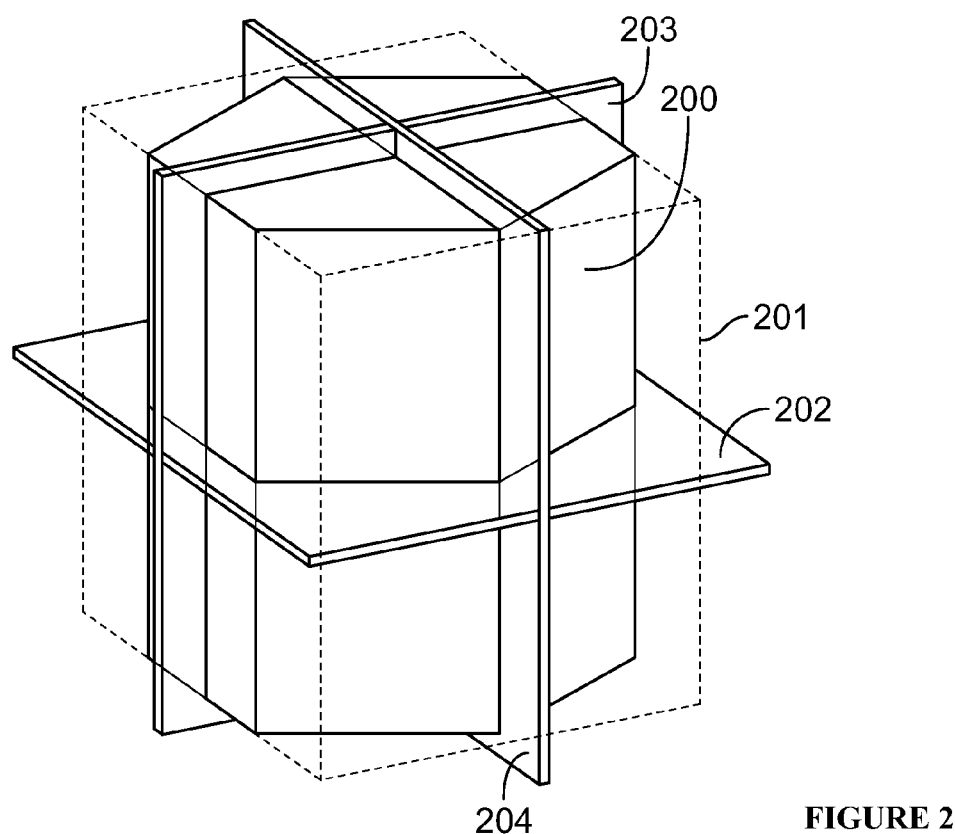
FIG. 2 is an illustration of a method of determining a center point of a 3D model for identifying a 3D model according to an embodiment of the present invention.

FIG. 2 is an illustration of a method of determining a center point of a 3D model 200 based on a minimum bounding box of the 3D model. A minimum bounding box 201 of an object represents a container with the smallest volume within which all dimensions of the object may be included. Based on the minimum bounding box, the 3D fingerprint generator may align the 3D model with three orthogonal axis planes 202, 203, 204 corresponding to an x-axis, a y-axis, and a z-axis, wherein each plane bisects a corresponding side of the minimum bounding box. Thus, each orthogonal axis plane may be positioned at a mid-point in between two maximum values along one axis. The intersection point of all three orthogonal axis planes may be set as the center point of the 3D model. As the intersection remains the same with respect to features of the 3D model regardless of rotation, tilt, alignment, color, and resizing, the center point determined in this manner may provide a consistent starting point for comparison of the physical characteristics and features of 3D models.

Figure 3:
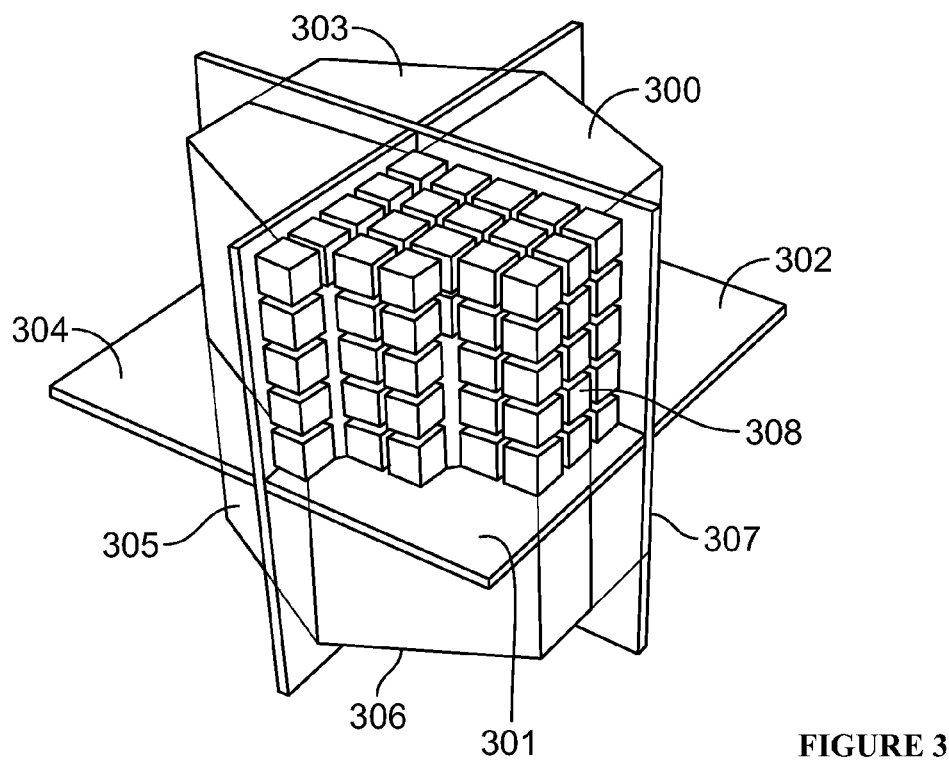
FIG. 3 is an illustration of a method of dividing a 3D model into quadrants for identifying a 3D model according to an embodiment of the present invention.

In addition to determining a center point, the bounding box and orthogonal axis planes may be used to divide the 3D model 300 into one or more quadrants 301, 302, 303, 304, 305, 306, 307 as shown in FIG. 3. Once the center point is determined, embodiments of the 3D fingerprint generator may divide the 3D model into the quadrants in order to divide the fingerprint information into separate regions, and the separation of the fingerprint information may be later used to analyze or identify only a certain region or quadrant of a 3D model in comparison to 3D fingerprint information.

Additionally, the 3D fingerprint generator may further divide each quadrant into smaller analysis units by starting at the center point of the 3D model and constructing analysis units which divide the 3D model into numerous similarly shaped cubic units 308 for which data can be specifically calculated. In this way, the 3D fingerprint generator may be configured to determine physical characteristics of the 3D model by measuring the 3D model within each analysis quadrant until the limits of the bounding box are reached. The smaller analysis units and the physical characteristics information collected for each may also be used to analyze or identify only a certain region or unit area of a 3D model in comparison to 3D fingerprint information.

For each analysis unit, information of the same physical characteristics previously discussed may be measured, including but not limited to: color, number of distinct parts within the analysis unit, clearance distance between the distinct parts, texture patterns on a surface of the 3D model within the analysis unit, thickness of a wall at a particular point of the 3D model within the analysis unit, tessellation value including information of a number of tessellation patterns, angles and curvature at particular points of the 3D model within the analysis unit, volume of the material used in the 3D model within the analysis unit, density of the 3D model within the analysis unit, particular characteristics of the polygon mesh, particular vertices, edges, and faces of the polygon mesh within the analysis unit, and particular variations of the polygon mesh within the analysis unit including tessellation, adaptive mesh refinement, and smoothing. The measurements obtained from the analysis units constructing each of the quadrants may then be used to determine the overall physical characteristics stored in the 3D fingerprint data structure for the 3D model.

Referring back to FIG. 1, the 3D fingerprint generator 103 may thus generate various factors related to physical characteristics of the 3D model which are not present in the 3D scan file created by the 3D scanner 102. The 3D fingerprint generator 103 may generate the various factors corresponding to the determined physical characteristics based on the determined center point and generate a 3D fingerprint file for storage and later retrieval. The 3D fingerprint file may assign and encode each determined physical characteristic to a defined factor within a predetermined data structure. The data structure of the generated 3D fingerprint may vary according to a type of file format used for the 3D fingerprint, which may include XML, JSON, YAML, CSV, and the like. However, in preferred embodiments, the file format of the generated 3D fingerprint will implement a standardized data structure to enable data transfer and use between various and incompatible systems.

An example of a portion of an XML file 700 representing a 3D fingerprint is shown in FIG. 7. The XML file 700 of FIG. 7 shows an example of a 3D fingerprint generated from the various physical characteristics determined from a 3D scan file. Thus, the XML file may include factors divided into identified regions or quadrants of the 3D model, wherein the factors include color, clearance (or a distance between two distinct parts of the 3D model), texture, wall thickness, tessellation (or a resolution value), curvature (for example, a value of an edge in comparison to a straight line), size, volume, and the. It will be understood by those of ordinary skill in the art that the 3D fingerprint XML file, or any file format representing a 3D fingerprint of a 3D model, may include various additional information including all factors determined from the physical characteristics of the 3D model as discussed herein.

Referring back to FIG. 1, upon generating a 3D fingerprint file of the 3D model 101, the 3D fingerprint generator 103 may store the 3D fingerprint file in a 3D fingerprint database 104. The 3D fingerprint file may be stored in addition to the 3D scan file in the 3D fingerprint database 104. The 3D fingerprint file and the 3D scan file may also be stored to be associated with metadata related to the 3D model or the various physical characteristics. For example, the stored metadata may include a name or description of the 3D model 101, a name or description of content related to the 3D model, a description of the appearance of the 3D model, a material forming the 3D model, descriptions of physical attributes of the 3D model, a source or ownership information of the 3D model, identifying information of a manufacturer or licensor, and the like.

As an example, if the 3D model is an action figure of a character from a children's television show, the stored metadata may include the name of the television show, the name of the character that is represented, the name of other characters in the television show, the name of a television network associated with the television show, the name of a licensor of the television show content, the name of a manufacturer, a copyright registration number associated with the action figure, or any additional information which may identify the 3D model or the content represented by the 3D model. Additionally, the metadata may include physical characteristics of the 3D model, including a general shape description, a general size value, a color, a number of appendages or other distinct portions such as wheels, a number of openings or holes through the 3D model, a description of a surface pattern or tessellation, a number of a particular angle present in the 3D model, and the like.

Once the 3D fingerprint has been generated and stored in the 3D fingerprint database 104, the 3D fingerprint may be indexed, searched, and retrieved based on the stored metadata. In other embodiments, the 3D fingerprint may also be indexed, searched, and retrieved based on the values of various factors included in the 3D fingerprint in order to search based on various physical characteristics of the 3D model 101.

Figure 4:
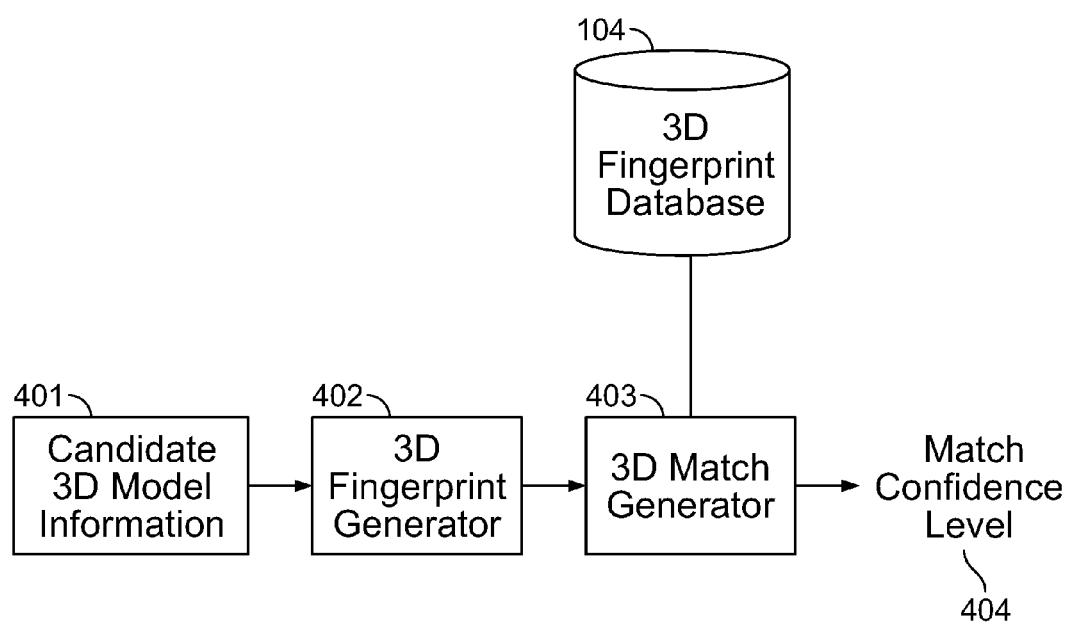
FIG. 4 is an illustration of an apparatus for identifying a 3D model according to another embodiment of the present invention.

Turning now to FIG. 4, an embodiment of the system 400 of the present disclosure is shown for obtaining 3D information 401 of a candidate 3D model and matching the 3D information to 3D fingerprint files stored in the 3D fingerprint database 104. The system 400 may include a 3D fingerprint generator 402 and a 3D match generator 403 configured to receive 3D information 401 of a candidate 3D model, wherein the candidate 3D model is submitted to check for known matches within the 3D fingerprint database.

The 3D match generator 403 may be implemented in order to determine that the candidate 3D model is not a previously known and protected design, such as copyrighted 3D objects and materials. In some embodiments, the 3D match generator may be implemented in order to identify candidate 3D models which are physically obtained. For example, prior to purchasing an object from a vendor, a person or entity may wish to ensure that the object is not pirated material or otherwise in violation of another party's copyrighted work. In such situations, the 3D scan information 401 may be obtained from a 3D scanner as previously discussed, which scans and produces a 3D scan file such as an STL file.

In other embodiments, the 3D match generator may be implemented to check whether 3D objects to be printed from 3D information files are copies of known 3D models by comparing the 3D information files to the 3D fingerprints of the 3D fingerprint database 104. For example, a 3D printing company that receives 3D printing files from its customers, or a 3D object printing repository offering 3D printing files for sale, may wish to ensure that all 3D printing files are original works and not pirated or otherwise in violation of another party's copyrighted work. In such situations, the candidate 3D scan information 401 may be obtained in a 3D printing file, such as an STL file, CAD file, SKP (sketch up) file, or other printing file received from another party.

The system 400 may include a 3D fingerprint generator 402 which receives the 3D information 401 and generates a 3D fingerprint file for the candidate 3D model based on the physical characteristics information included in the 3D information 401. As discussed, the 3D fingerprint generator 402 may generate the 3D fingerprint by first obtaining the center point of the candidate 3D model and identifying various factors of the candidate 3D model based on the physical characteristics information. The 3D fingerprint of the candidate 3D model may be output by the 3D fingerprint generator 402 in a predefined data structure, such as an XML file. In some alternate embodiments, the 3D match generator 403 may be configured to process the 3D scan information to obtain data related to the physical characteristics of the candidate 3D model, including the physical characteristics associated with the factors stored in the 3D fingerprint files of the system.

The 3D match generator 403 may then retrieve 3D fingerprint files from the 3D fingerprint database 104 for comparison with the 3D fingerprint generated by the 3D fingerprint generator 402 for the candidate 3D model. The 3D match generator 403 may thus obtain the 3D fingerprint of the candidate 3D model and perform a comparison with all stored 3D fingerprints stored in the 3D fingerprint database 104.

In alternate embodiments, the 3D match generator 403 may query the 3D fingerprint database 104 for 3D fingerprint files which may be related or relevant to the candidate 3D model. The query may include metadata associated with the candidate 3D model in order to retrieve the relevant 3D fingerprint files. The metadata for the candidate 3D model may be obtained from another party that supplied the 3D information 401, or it may be detected and generated based on the 3D information 401 or the generated 3D fingerprint for the candidate 3D model.

As an example, if the candidate 3D model is an object representing a character from a television show, the query to the 3D fingerprint database may include metadata such as the name of the television show, the name of the character that is represented, the name of other characters in the television show, the name of a television network associated with the television show, the name of a licensor of the television show content, the name of a manufacturer, or any additional information which may identify the candidate 3D model or the content represented by the candidate 3D model.

Additionally, the query may include physical characteristics of the candidate 3D model, including a general shape description, a general size, a color, a number of appendages or other distinct portions such as wheels, a number of openings or holes through the candidate 3D model, a description of a surface pattern or tessellation, a number of a particular angle present in the candidate 3D model, and the like. The 3D match generator 403 may compare each factor of the 3D fingerprint of the candidate 3D model with each factor of a 3D fingerprint of the 3D fingerprint database 104 to determine and output a match level, otherwise referred to as a match confidence level 404. The match confidence level 404 may correspond to the degree of similarity of the factors of the 3D fingerprint of the candidate 3D model with a 3D model represented in the 3D fingerprint database 104.

In some embodiments, the match confidence level 404 may include individual match confidence levels for each factor of the 3D fingerprint comparison, and each individual match confidence level may correspond to the amount of similarity of the factors relative to the possible variance for that particular factor. Each match confidence level for the various factors may contribute to determine the overall match confidence level for the candidate 3D model to the 3D fingerprint.

Based on the match confidence level, the 3D match generator 403 may eliminate non-matches, provide 3D fingerprint information for those that generate at least a minimum match confidence level, or provide information of a single 3D fingerprint file which has the highest match confidence level. The 3D match generator 402 may be configured to store each match confidence level in a temporary data table of a memory, or store each match confidence level in a record of database or other data structure. The stored match confidence level may be used to compare to later generated match confidence levels, or may be stored for later retrieval and comparison. The 3D match generator may also output the match confidence level to another system or display the match confidence level or related indication to a display of the system.

For example in one embodiment, the 3D match generator may be configured to automatically eliminate from consideration any 3D fingerprint files which result in a match confidence level of 20% or lower with a candidate 3D model. For match confidence levels greater than 80%, the 3D match generator 403 may store in a memory or provide an indication that a match has been found for the candidate 3D model. For all match confidence levels between 20% and 80%, the 3D match generator 403 may store in a memory or indicate that further manual or other comparison is required in order to make a match determination due to the ambiguous match confidence level.

In such embodiments, the additional comparison may include resubmitting the candidate 3D model and the particular 3D fingerprint file for comparison by the 3D match generator 403 with altered comparison settings. Such setting alterations may include shifting of separate components of the candidate 3D model with respect to each other, increasing or decreasing the measurement unit level resulting in smaller or larger face sizes in the polygon mesh, removing a factor from consideration in the comparison such as color, density, and the like, or other changes which may affect the level of match between the candidate 3D model and the 3D fingerprint file information.

Additionally, certain portions of the models may be completely removed from consideration in the comparison by the 3D match generator 403 to obtain an accurate match confidence level 404 for a desired portion of the models. In these embodiments, the 3D match generator 403 may be configured to consider only a portion of the candidate 3D model or only a portion of the 3D fingerprint file when performing the comparison, such as a particular quadrant defined by the axis planes as previously discussed. Thus, the 3D match generator 403 may compare only a certain quadrant or region of the models. In other embodiments, the 3D match generator 403 may be configured to provide match confidence levels for each quadrant or region of the candidate 3D model in comparison to a particular 3D fingerprint file, such that if one quadrant or region is an exact match while the remaining quadrants or regions are dissimilar, the identical quadrant or region may still be identified with a high match confidence level 404 by the 3D match generator 403.

If the 3D scan information results in a low match confidence level 404, the 3D match generator 403 may store the 3D fingerprint of the candidate 3D model along with any other generated data and metadata in the 3D fingerprint database 104 to increase the number of known and recognized 3D fingerprints. The 3D fingerprint of the candidate 3D model may be stored along with information from the comparison, including match confidence levels, or identifiers of 3D fingerprints stored in the 3D fingerprint database 104 that resulted in the highest match confidence level during the comparison.

In other embodiments, the 3D match generator 403 may store the 3D fingerprint of the candidate 3D model even where the match confidence level is ambiguous (for example, 20%-80%) or high (for example, greater than 80%). The 3D fingerprints may be stored to include the match confidence levels, a parent-child pointer to and from the matching 3D fingerprint already stored in the 3D fingerprint database 104 to record information of the previous comparison, information of where and when the candidate 3D model was obtained and compared, and any additional metadata to identify the candidate 3D model.

In another embodiment, the system 400 may include an input/output interface, including a display which displays to an operator each match confidence level and the overall match confidence level 404. Alternatively, the system 400 may include a communication interface that connects the 3D match generator to a network, such as the internet, and another party may submit the 3D scan information 401 of the candidate 3D model via the network for comparison by the 3D match generator 403 to the 3D fingerprints of the 3D fingerprint database 104. In such embodiments, the 3D match generator 403 may be configured to transmit information related to the comparison including the match confidence level 404 via the network to another computer system of the network. In some embodiments, the 3D match generator 403 may be implemented in one or more computers with circuitry configured to provide communication with the network such as the internet and server computers associated with various memory and stored databases of the system.

Figure 5:
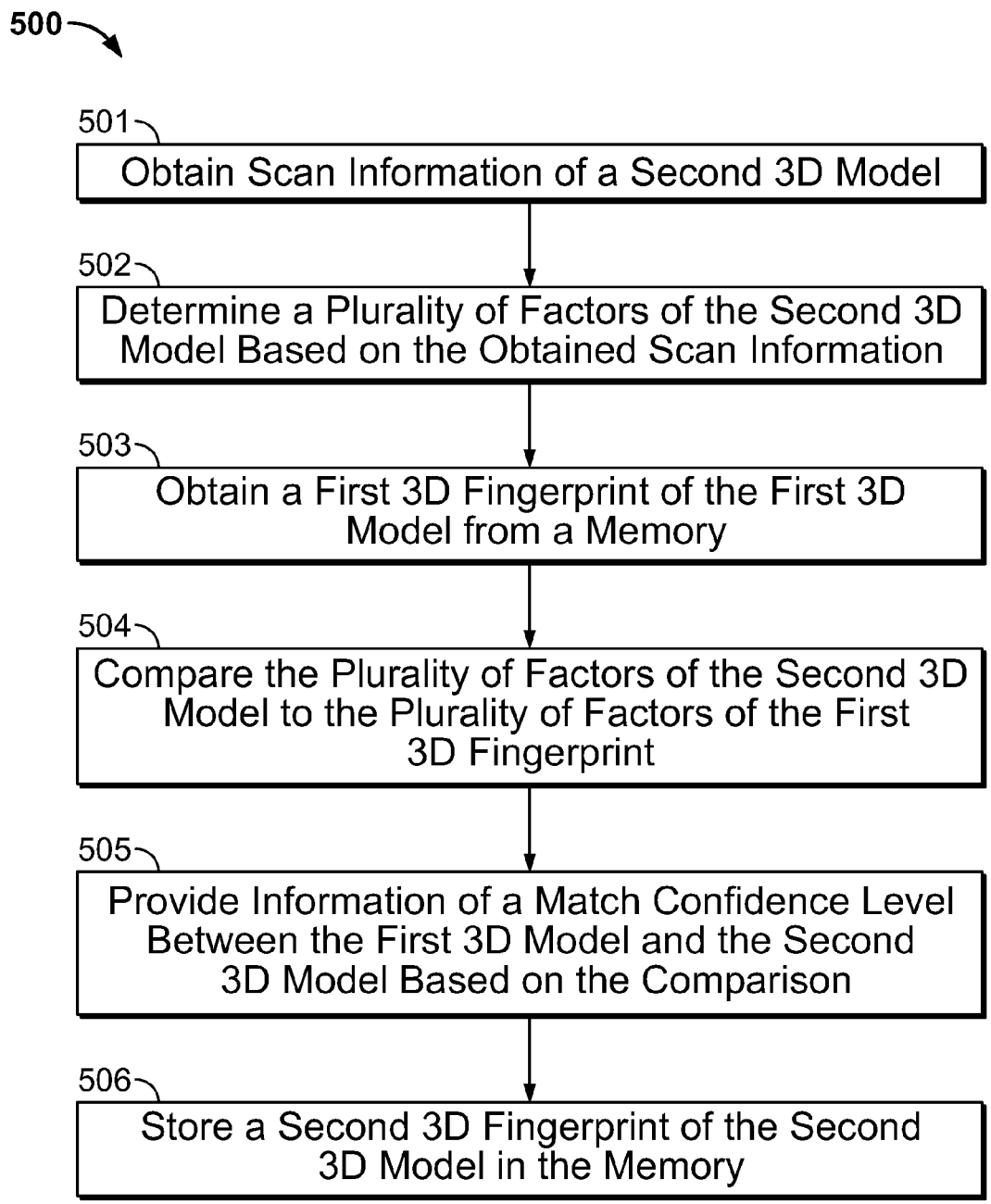
FIG. 5 is an illustration of a flowchart of a method for identifying a 3D model according to an embodiment of the present invention.

Turning now to FIG. 5, a flowchart 500 of a method for identifying a 3D model according to an embodiment of the present disclosure is shown. The method may include obtaining scan information of a second 3D model at block 501 wherein the scan information comprises a plurality of physical characteristics of the second 3D model. As previously discussed, in other embodiments of the method the 3D information of the second 3D model may include a source other than a 3D scan, including engineered 3D information files, such as CAD files in various file formats.

The method depicted in FIG. 5 includes determining a plurality of factors of the second 3D model based on the obtained scan information at block 502, obtaining a first 3D fingerprint of the first 3D model from a memory at block 503 wherein the first 3D fingerprint comprises a plurality of factors associated with the first 3D model, and comparing the plurality of factors of the second 3D model to the plurality of factors of the first 3D fingerprint at block 504. The method may further include at block 505 providing information of a match confidence level between the first 3D model and the second 3D model based on the comparison, and at block 506, storing a second 3D fingerprint of the second 3D model in the memory wherein the second 3D fingerprint comprises the determined plurality of factors of the second 3D model.

According to embodiments of the present invention, a system for identifying a 3D model may include a 3D fingerprint generator configured to generate a 3D fingerprint file comprising physical characteristic information of a 3D model based on 3D information. The system may further include a 3D fingerprint database for storing generated 3D fingerprints, and in some embodiments the 3D fingerprints may be stored in association with identifying metadata of the 3D model. The system may further include a 3D match generator configured to compare a 3D fingerprint of a candidate 3D model with 3D fingerprints stored in the 3D fingerprint database.

Various embodiments described herein may be implemented in a computer-readable non-transitory medium, a machine-readable medium, or similar medium using, for example, software, hardware, or any combination thereof. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. In some cases, such embodiments are implemented by a controller or a processor.

The various devices, modules, terminals, and the like discussed herein may be implemented on a computer by execution of software comprising machine instructions read from computer-readable non-transitory medium. These hardware aspects may further include an input/output interface, graphical user interface, or other input/output means to allow the input/output of information related to controlling functions, inputting information, outputting information, receiving information, or transmitting information. The hardware aspects may further include circuitry, wired and wireless networking hardware, and hardware connectivity configurations to enable to various computers, processors, memory, interfaces, and the like to communicate, transmit, receive, and otherwise exchange information with each other, and with external or third party sources, such as the Internet. In certain embodiments, several hardware aspects may be implemented using a single computer, in other embodiments multiple computers, input/output systems, and hardware components may be used to implement the system.

For a software implementation, certain embodiments described herein may be implemented with separate software modules, such as procedures and functions, each of which perform one or more of the functions and operations described herein. The software code can be implemented with a software application written in any suitable programming language and may be stored in memory and executed by a controller or processor.

The foregoing disclosed embodiments and features are merely exemplary and are not to be construed as limiting the present invention. The present teachings can be readily applied to other types of apparatuses and processes. The description of such embodiments is intended to be illustrative, and not to limit the scope of the claims. Many alternatives, modifications, and variations will be apparent to those skilled in the art.

What is claimed is:

1. A matching method for a first three-dimensional (3D) model, the method comprising:

obtaining 3D source information of a second 3D model, the 3D source information comprising a plurality of physical characteristics of the second 3D model;

determining a plurality of factors of the second 3D model based on the obtained 3D source information;

obtaining a first 3D fingerprint of the first 3D model from a memory, the first 3D fingerprint comprising a plurality of factors associated with the first 3D model;

comparing the plurality of factors of the second 3D model to the plurality of factors of the first 3D fingerprint;

providing information of a match confidence level between the first 3D model and the second 3D model based on the comparison; and storing a second 3D fingerprint of the second 3D model in the memory, the second 3D fingerprint comprising the determined plurality of factors of the second 3D model, wherein the determined plurality of factors of the second 3D model are based on a center point of the second 3D model corresponding to a geometric center determined based on an intersection point of three orthogonal axis planes.

2. The method of claim 1, wherein the first 3D fingerprint comprises a plurality of physical characteristics of the first 3D model in a predefined data structure configured to assign each of the plurality of physical characteristics to a corresponding factor of the plurality of factors associated with the first 3D model.

3. The method of claim 1, wherein:
the determined plurality of factors of the second 3D model comprises information of eight quadrants of the second 3D model; and
each quadrant is defined by the three orthogonal planes.

4. The method of claim 1, further comprising:
generating a second 3D fingerprint comprising the determined plurality of factors of the second 3D model in a predefined data structure,
wherein comparing the plurality of factors of the second 3D model to the plurality of factors of the first 3D fingerprint comprises comparing the second 3D fingerprint to the first 3D fingerprint.

5. The method of claim 1, wherein the determined plurality of factors of the second 3D model comprises information related to:
a color of the second 3D model;
a number of parts of the second 3D model;
a distance between a first part and a second part of the second 3D model;
a thickness of a wall of the second 3D model;
a number of tessellation patterns on a surface of the second 3D model;
a size of a minimum bounding box of the second 3D model;
a volume of the minimum bounding box;
a volume of a material of the second 3D model;
a polygon mesh comprising a plurality of vertices, edges, and faces of a surface of the second 3D model;
the center point of the second 3D model; or
eight quadrants of the second 3D model each defined by an intersection of the three orthogonal planes.

6. The method of claim 5, wherein the information of the match confidence level comprises an individual match confidence level for each of the plurality of factors.

7. The method of claim 1, further comprising setting an indicator when the match confidence level is less than or equal to a first threshold value and greater than or equal to a second threshold value.

8. The method of claim 1, wherein the second 3D model comprises a first portion separable from a second portion; and
the plurality of physical characteristics of the second 3D model comprises a size ratio of the first portion to the second portion.

9. The method of claim 1, wherein the first 3D fingerprint is obtained from another party in response to a request including information of the second 3D model.

10. An apparatus for matching a first three-dimensional (3D) model, the apparatus comprising:
a display configured to display information; and
least one controller configured to:
obtain 3D source information of a second 3D model, the 3D source information comprising a plurality of physical characteristics of the second 3D model;
determine a plurality of factors of the second 3D model based on the obtained 3D source information;
obtain a 3D fingerprint of the first 3D model from a memory, the first 3D fingerprint comprising a plurality of factors associated with the first 3D model;
compare the plurality of factors of the second 3D model to the plurality of factors of the first 3D fingerprint;
cause the display to display information of a match confidence level between the first 3D model and the second 3D model based on the comparison; and
cause the memory to store a second 3D fingerprint of the second 3D model in the memory, the second 3D fingerprint comprising the determined plurality of factors of the second 3D model,
wherein the determined plurality of factors of the second 3D model are based on a center point of the second 3D model corresponding to a geometric center determined based on an intersection point of three orthogonal axis planes.

11. The apparatus of claim 10, wherein the first 3D fingerprint comprises a plurality of physical characteristics of the first 3D model in a predefined data structure configured to assign each of the plurality of physical characteristics to a corresponding factor of a plurality of factors of the first 3D model.

12. The apparatus of claim 10, wherein:
the determined plurality of factors of the second 3D model comprises information of eight quadrants of the second 3D model; and
each quadrant is defined by the three orthogonal planes.

13. The apparatus of claim 10, wherein the at least one controller is further configured to:
generate a second 3D fingerprint comprising the determined plurality of factors of the second 3D model in a predefined data structure; and
compare the plurality of factors of the second 3D model to the plurality of factors of the first 3D fingerprint by comparing the second 3D fingerprint to the first 3D fingerprint.

14. The apparatus of claim 10, wherein the determined plurality of factors of the second 3D model comprises information related to:
a color of the second 3D model;
a number of parts of the second 3D model;
a distance between a first part and a second part of the second 3D model;
a thickness of a wall of the second 3D model;
a number of tessellation patterns on a surface of the second 3D model;
a size of a minimum bounding box of the second 3D model;

a volume of the minimum bounding box;
a volume of a material of the second 3D model;
a polygon mesh comprising a plurality of vertices, edges, and faces of a surface of the second 3D model;
the center point of the second 3D model; or
eight quadrants of the second 3D model each defined by an intersection of the three orthogonal planes.

15. The apparatus of claim 10, wherein the at least one controller is further configured to set an indicator when the match confidence level is less than or equal to a first threshold value and greater than or equal to a second threshold value.

16. The apparatus of claim 10, wherein the second 3D model comprises a first portion separable from a second portion; and
the plurality of physical characteristics of the second 3D model comprises a size ratio of the first portion to the second portion.

17. The apparatus of claim 10, wherein the first 3D fingerprint is obtained from another party in response to a request including information of the second 3D model.

18. A machine-readable non-transitory medium having stored thereon machine-executable instructions for matching a first three-dimensional (3D) model, the machine-executable instructions comprising:
obtaining 3D source information of a second 3D model, the 3D source information comprising a plurality of physical characteristics of the second 3D model;
determining a plurality of factors of the second 3D model based on the obtained 3D source information;
obtaining a first 3D fingerprint of the first 3D model from a memory, the first 3D fingerprint comprising a plurality of factors associated with the first 3D model;
comparing the plurality of factors of the second 3D model to the plurality of factors of the first 3D fingerprint;
providing information of a match confidence level between the first 3D model and the second 3D model based on the comparison; and
storing a second 3D fingerprint of the second 3D model in the memory, the second 3D fingerprint comprising the determined plurality of factors of the second 3D model,
wherein the determined plurality of factors of the second 3D model are based on a center point of the second 3D model corresponding to a geometric center determined based on an intersection point of three orthogonal axis planes.

19. The machine-readable non-transitory medium of claim 18, wherein the first 3D fingerprint comprises a plurality of physical characteristics of the first 3D model in a predefined data structure configured to assign each of the plurality of physical characteristics to a corresponding factor of a plurality of factors of the first 3D model.

20. The machine-readable non-transitory medium of claim 18, wherein:
the determined plurality of factors of the second 3D model comprises information of eight quadrants of the second 3D model; and
each quadrant is defined by the three orthogonal planes.

21. The machine-readable non-transitory medium of claim 18, wherein the machine-executable instructions stored thereon further comprises instructions for:
generating a second 3D fingerprint comprising the determined plurality of factors of the second 3D model in a predefined data structure; and
comparing the plurality of factors of the second 3D model to the plurality of factors of the first 3D fingerprint by comparing the second 3D fingerprint to the first 3D fingerprint.

22. The machine-readable non-transitory medium of claim 18, wherein the determined plurality of factors of the second 3D model comprises information related to:
a color of the second 3D model;
a number of parts of the second 3D model;
a distance between a first part and a second part of the second 3D model;
a thickness of a wall of the second 3D model;
a number of tessellation patterns on a surface of the second 3D model;
a size of a minimum bounding box of the second 3D model;
a volume of the minimum bounding box;
a volume of a material of the second 3D model;
a polygon mesh comprising a plurality of vertices, edges, and faces of a surface of the second 3D model;
the center point of the second 3D model; or
eight quadrants of the second 3D model each defined by an intersection of the three orthogonal planes.

23. The machine-readable non-transitory medium of claim 18, wherein the first 3D fingerprint is obtained from another party in response to a request including information of the second 3D model.

* * * * *